No. 707,854. Patented Aug. 26, 1902.
A. F. LUNDEBERG.
PROCESS OF EXTRACTING OILS.
(Application filed Nov. 7, 1899.)
(No Model.)
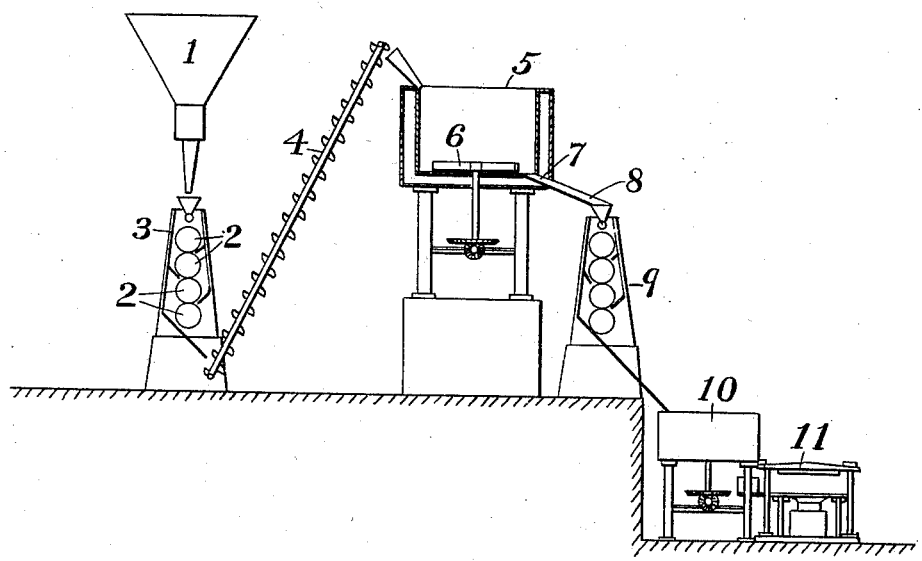

UNITED STATES PATENT OFFICE.

AUGUST FREDRIK LUNDEBERG, OF STOCKHOLM, SWEDEN.

PROCESS OF EXTRACTING OILS.

SPECIFICATION forming part of Letters Patent No. 707,854, dated August 26, 1902.

Application filed November 7, 1899. Serial No. 736,169. (No specimens.)

*To all whom it may concern:*

Be it known that I, AUGUST FREDRIK LUNDEBERG, a subject of the King of Sweden and Norway, and a resident of Stockholm, Sweden, have invented certain new and useful Improvements in Extracting Vegetable Oils, of which the following is a specification.

This invention relates to the extraction of vegetable oils by pressure; and the object of the invention is to increase the yield of oil from the seed.

By the ordinary method of extracting oil from seed by heat and pressure the seed is first heated, then crushed, then heated, and then pressed. I find, however, that by first crushing the seed while cold, then heating the crushed mass, and then a second time crushing the mass before pressing an important advantage is gained. The second crushing after heating causes the cells of the seed, which have been expanded by the heating, to burst readily and facilitate the outflow of the oil under pressure. When seed is treated in this manner, it will be found that the percentage of oil remaining in the cake is greatly reduced, and the time required for pressing will also be reduced from fifteen to twenty-five per cent.

The diagrammatic view in the drawing illustrates a suitable apparatus for carrying out the process.

In the drawing, 1 is a hopper from which the seed is fed down to crushing-rolls 2 in a casing 3. From the casing the crushed seed passes to an elevator 4, which carries it up and discharges it into a heater 5. This heater may be a box or receptacle with double walls and bottom, the space between the walls to receive steam. Within the heater, which is represented in section, is a rotating stirrer 6, which stirs the ground mass and pushes it out through an outlet 7, whence it flows, by an inclined spout 8, to a second crusher 9, similar to that first named. From this second crusher the crushed seed falls into a second receptacle 10, which may be heated in the same way as the receptacle 5 and which has in it a stirrer similar to that in the receptacle 5. From the receptacle 10 the ground seed is taken to the press 11, where it is pressed in cloths in a known way to express the oil.

Having thus described my invention, I claim—

The herein-described method of extracting vegetable oils, which consists in first crushing the seed while cold, then heating it, then crushing it a second time, and finally pressing it.

In witness whereof I have hereunto signed my name in the presence of two subscribing witnesses.

AUGUST FREDRIK LUNDEBERG.

Witnesses:
HANS B. OHESSON,
J. F. A. RUTBÄCK.